(No Model.)
M. F. MORAN.
SANITARY TRAP.
No. 578,827. Patented Mar. 16, 1897.
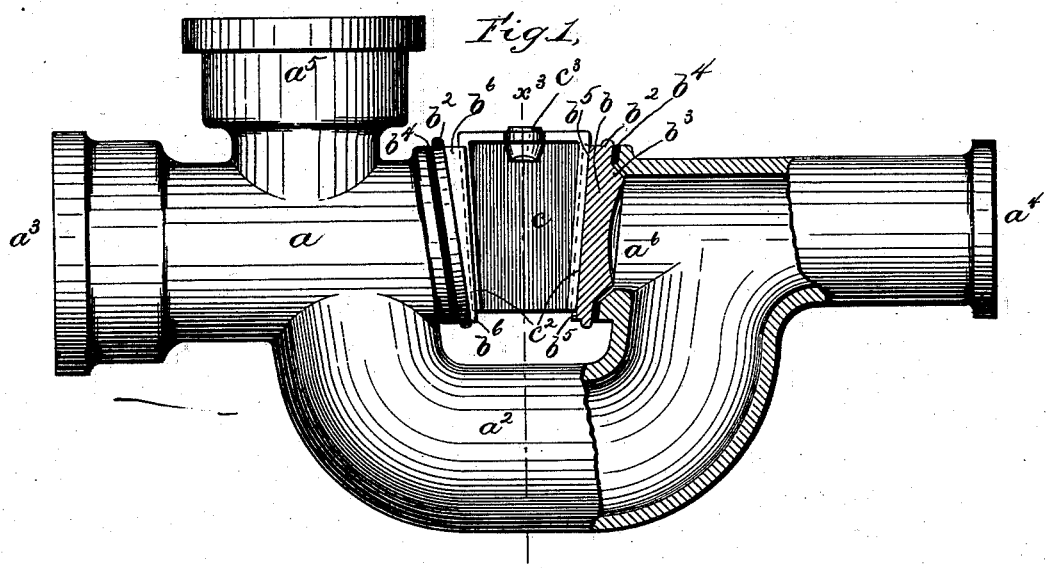
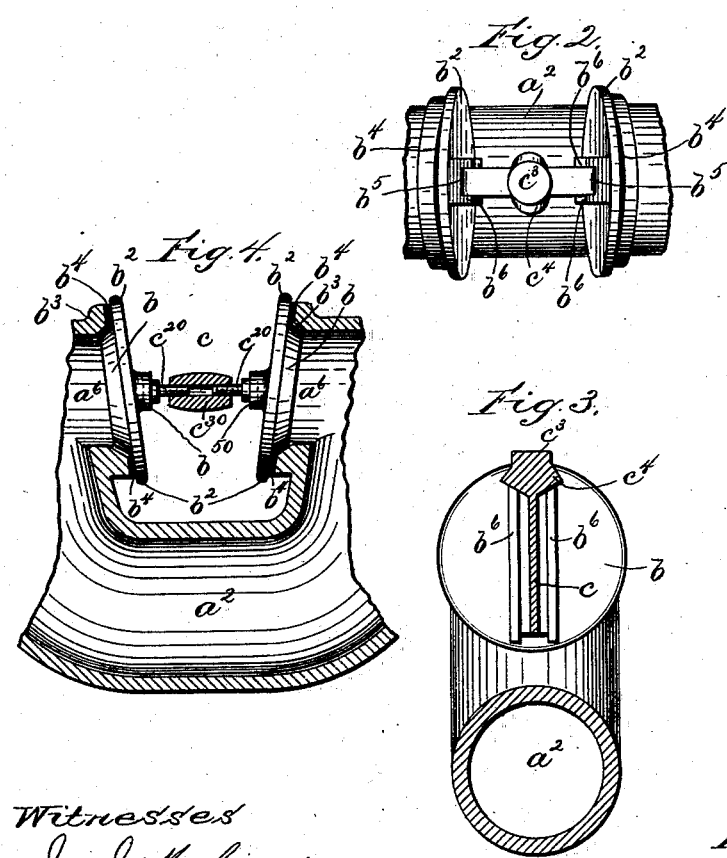
Witnesses
Jas. J. Maloney
Jo. P. Livermore
Inventor,
Myles F. Moran,
by Jo. P. Livermore
Att'y

UNITED STATES PATENT OFFICE.

MYLES F. MORAN, OF LYNN, MASSACHUSETTS.

SANITARY TRAP.

SPECIFICATION forming part of Letters Patent No. 578,827, dated March 16, 1897.

Application filed October 8, 1894. Serial No. 525,247. (No model.)

*To all whom it may concern:*

Be it known that I, MYLES F. MORAN, of Lynn, county of Essex, State of Massachusetts, have invented an Improvement in Sanitary Traps, of which the following description, in connection with the accompanying drawings, is a specification, like letters on the drawings representing like parts.

The present invention relates to a water-seal trap such as is used in waste-pipes, the object of the invention being to provide a trap of this kind which will be simple and inexpensive to construct and readily accessible for cleaning purposes after it is in use.

The trap embodying the invention has the usual U-shaped depression to contain the water seal, and is provided with an opening in the inner wall of the U-shaped portion thereof, by which access may be had to the trap, and a cover for said opening normally held in place by a suitable external fastening device interposed between it and the opposite branch of the U-shaped portion, which preferably contains another opening provided with a similar cover against which the said fastening abuts, so that both covers are secured by the single fastening device, which may be a simple block or wedge interposed between the outer surfaces of said covers or any suitable external fastening, such, for example, as a bolt, which can be so applied as to press the covers apart and thus force them into place in their respective openings or which may be withdrawn to permit the removal of the covers therefrom.

Figure 1 is a side elevation, partly in longitudinal section, of a trap embodying my invention, the retaining device and one of the covers being shown in elevation and the other cover in section; Fig. 2, a plan view of the middle portion thereof; Fig. 3, a transverse vertical section thereof on line $x^3$, Fig. 1; and Fig. 4, a sectional elevation showing a modification of the fastening device.

The trap $a$ may be of substantially the usual shape and material and has the usual U-shaped bend or depression $a^2$ to contain the water seal between the inlet and outlet openings $a^3$ $a^4$, by which it is connected to the waste-pipe to be trapped, and is shown as also provided with an opening $a^5$ for connection with a ventilating-pipe, as usual.

In order to afford access to the interior of the trap for cleaning, the inner walls of the bend $a^2$ are provided with openings $a^6$, which are thus opposite to each other and readily accessible from the space between the branches of the bend. Each of the said openings is provided with a cover $b$, the said covers being provided with a flange $b^2$ of sufficient size to overlap the opening $a^6$, and a beveled portion $b^3$, adapted to fit in the said opening, the edges of which are also beveled to correspond. A suitable packing-ring or gasket $b^4$ is also provided to prevent leakage when the cover is in place. In order that said covers may be firmly held in a position to close the openings and at the same time may be readily removable when required, an external fastening device $c$ is interposed between them, (shown in Figs. 1, 2, and 3,) as a key or wedge, having its edges $c^2$ slightly converging from top to bottom, and the covers $b$ are also provided each with a corresponding inclined rib or key-seat $b^5$ on their outer surface, so that when the said fastening device $c$ is driven in between them it wedges them apart toward their respective openings. The said seats $b^5$ are preferably provided with flanges $b^6$, constituting a guide to retain the fastening device on its seat.

The retaining device $c$ is preferably provided at its top with a head or enlargement $c^3$ to receive the blow of a hammer when it is being driven into place, and the said enlargement is preferably provided with a lateral extension $c^4$ at its under side, as clearly shown in Figs. 2 and 3, so that it can be tapped underneath by a hammer and loosened when it is desired to remove the covers.

By placing the opening $a^6$ in the inner side wall of the bend that portion of the bend opposite the opening can be utilized as an abutment or support for any suitable external fastening device adapted to hold the cover in place by pressure on the outside thereof. As an example of another form of external fastening device the modification, Fig. 4, is shown, in which the fastening device $c$ consists of two bolts $c^{20}$, having, respectively, right and left threads, said bolts entering opposite ends of a nut $c^{30}$, so that when said nut is turned in one direction it will force the ends of the bolts apart and press them against the covers and will withdraw them apart from said covers when turned in the opposite direction. The ends of said bolts $c^{20}$ are preferably squared and adapted to fit correspondingly-shaped recesses or sockets $b^{50}$ in the covers $b$ to prevent said bolts from turning with relation to the cover when the nut is turned. Covers secured in this way by an external fastening device supported by an opposite portion of the trap as an abutment may be held more or less closely on their seats by a proper manipulation of the fastening device which may be adjusted if at any time it is found that the covers need to be tightened to prevent leakage.

Traps constructed in accordance with the present invention are easily and inexpensively made, as there is no fine fitting, so that but little, if any, machine-work is required, and the opening or openings are so placed that the interior of the trap is readily accessible through them, and the covers are very easily removed or put in place without the use of special tools.

It is not intended to limit the invention to the exact form herein shown and described, since obvious modifications might be made without departing from the invention.

I claim—

1. A trap having a bend or U-shaped sealing portion located between its inlet and outlet, and provided with oppositely-located openings in said U-shaped portion, combined with exteriorly-removable covers for said openings and an external retaining device interposed between said covers and holding both covers seated in their corresponding openings, substantially as described.

2. The combination with a trap having a U-shaped sealing portion and an inlet at one side and an outlet at the other side thereof, provided with oppositely-located openings in the U-shaped portion, of exteriorly-removable covers for said openings and an adjustable fastening device coöperating with both said covers, substantially as described.

3. The combination with the trap having a U-shaped sealing portion located between its inlet and outlet and provided with oppositely-located openings in said U-shaped portions and exteriorly-removable flanged covers seating over said openings and a fastening device interposed between the said covers and maintaining both seated in their corresponding openings, substantially as described.

4. The combination with a trap having a U-shaped sealing portion and an inlet at one side and an outlet at the other side thereof, provided with oppositely-located openings in the U-shaped portion, of covers for said openings provided upon their outer faces with key-seats and a wedge-shaped fastening device or key to coöperate with said key-seats and maintain the covers seated in the openings, substantially as described.

5. A trap having a bend or U-shaped sealing portion located between the inlet and outlet, one of the branches of said sealing portion having an opening therein between the bow of the seal and the end of the branch whereby direct access may be had to the interior of the sealing portion, combined with an exteriorly-removable cover for the opening, and an external retaining device interposed between the exterior of said cover and the opposite branch of the sealing portion to maintain the cover seated in the opening, substantially as described.

In testimony whereof I have signed my name to this specification in the presence of two subscribing witnesses.

MYLES F. MORAN.

Witnesses:
H. J. LIVERMORE,
JAS. J. MALONEY.